Jan. 20, 1948.    W. P. MASON    2,434,667
ULTRASONIC PRISM
Filed June 5, 1943    2 Sheets-Sheet 1

INVENTOR
W. P. MASON
BY
ATTORNEY

Jan. 20, 1948.    W. P. MASON    2,434,667
ULTRASONIC PRISM
Filed June 5, 1943    2 Sheets-Sheet 2
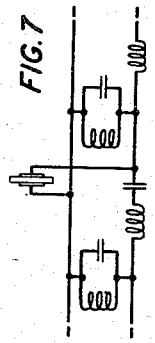
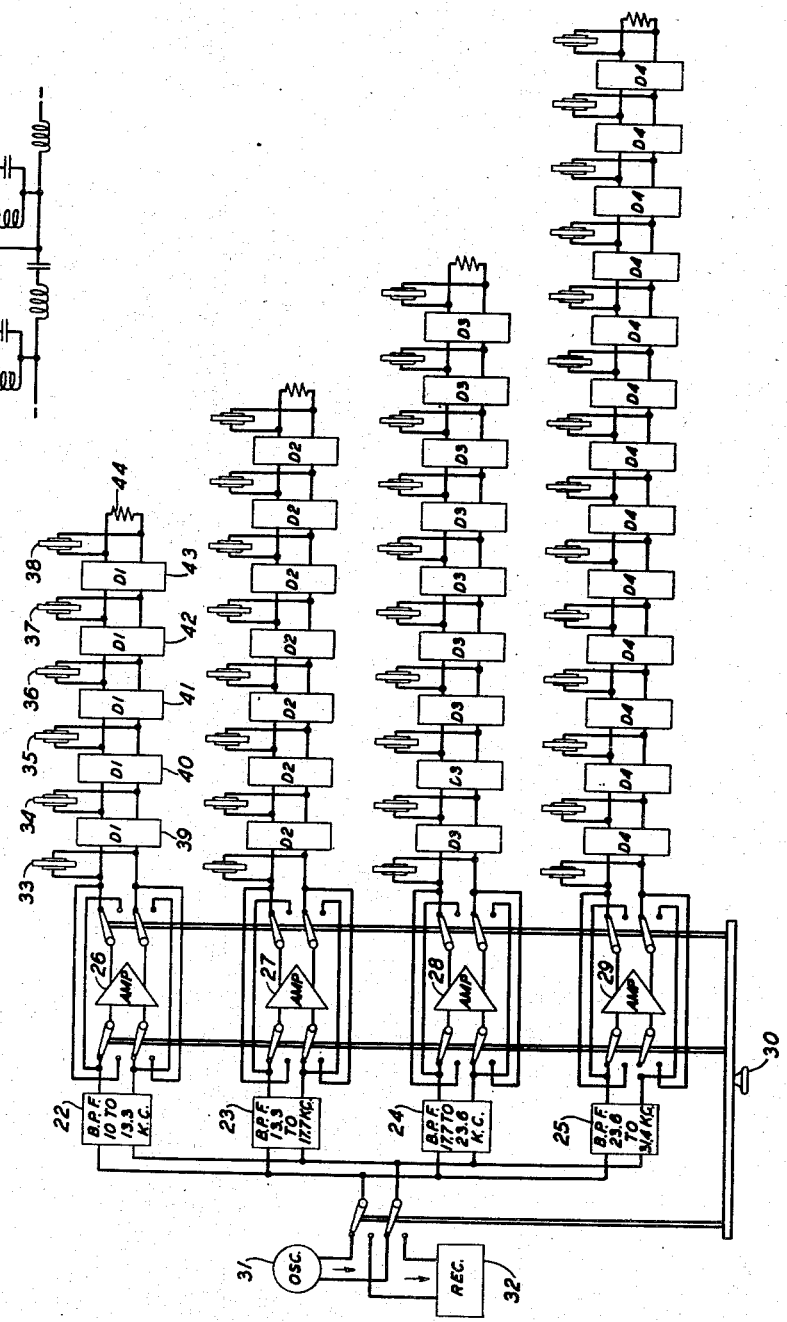
INVENTOR
W. P. MASON
BY
ATTORNEY Patented Jan. 20, 1948

2,434,667

UNITED STATES PATENT OFFICE 2,434,667

ULTRASONIC PRISM

Warren P. Mason, West Orange, N. J., assignor to Bell Telephone Laboratories, Incorporated, New York, N. Y., a corporation of New York Application June 5, 1943, Serial No. 489,761

5 Claims. (Cl. 177—386)

This invention relates to locating devices and particularly to that class of devices by which ultrasonic vibrations set up by propellers of ships are located in direction.

The invention makes use of certain principles of prismatic determination which are completely disclosed in my copending applications, one entitled "Pipe antennas and prisms," Serial No. 381,236, filed March 1, 1941, Patent No. 2,408,435, and another entitled "Prismatic and high power compressional wave radiators and receivers," Serial No. 431,558, filed February 19, 1942, Patent No. 2,404,391. In some aspects the present invention is an improvement on the device disclosed in my copending application entitled "Submarine detecting device," Serial No. 477,916, filed March 4, 1943.

The object of the invention is to provide a prismatic device having a range of 360 degrees or a full sweep in all directions about a given point. Heretofore and particularly by means of the submarine detecting device disclosed in my last-mentioned application the azimuth angle of a source of disturbance could be determined, but in that case the determination was made by calculation after making at least two angular determinations by at least two separate but similar prisms. The object of the present invention is to provide a prismatic device which will cover the whole range of 360 degrees and give a single response constituting a direct indication of the azimuth angle.

In accordance with the present invention a plurality of prisms each having a different range are physically located with respect to each other to cover 360 degrees and placed in an electrical network whereby each is rendered active over its particular range.

The simplest embodiment of the invention comprises a pair of prisms each capable of a range of 180 degrees and arranged in a filter network whereby as one prism reaches its limit of response the other begins to function.

It will be appreciated however that these prismatic devices have response characteristics whereby the greatest accuracy centers about the line normal to the longitudinal axis thereof so that if the range of the device is limited to a smaller range than its complete capability its accuracy is improved. Thus the simple prism is capable of a range of plus or minus 90 degrees and so two placed parallel to each other and in a position that might be termed back to back are capable of covering 360 degrees. However, if three such prisms are placed in an equilateral formation each would only be called upon to operate over a range of plus or minus 60 degrees and hence the accuracy of the device as a whole would be improved. By the same token a device having four legs regularly spaced would require each leg to respond over a range of plus or minus 45 degrees with a consequent still further improvement in accuracy. In general, the larger number of legs employed resulting in the lesser range covered by each leg leads to greater accuracy. It will be recognized that this subdivision may be carried out until the prisms each with an extremely narrow range are arranged in a circle. Ultimately in this process the prisms will lose their identity as prisms and the discrimination will occur wholly in the associated network.

As a preferred embodiment of the invention a device having four legs is disclosed herein by way of example.

A feature of the invention is a prismatic responsive device for covering a complete azimuthal range consisting of a plurality of prisms each having a range consisting of a corresponding fractional part of said complete range.

Another feature of the invention is a device comprising a plurality of prisms in combination with an electrical network which will automatically admit to each prism only currents within its range.

A further feature of the invention is an electrical network which will automatically transfer admission of different frequency currents into a plurality of different prisms in ranges of the highest accuracy of the same prisms.

Another feature of the invention is an electromechanical transducer comprising a plurality of prisms physically arranged with the lines normal to their longitudinal axes radiating at equal angles from a common point and a network associated therewith for controlling said prisms each within that portion of its range measured by the angles formed between said radii.

Other features will appear hereinafter.

The drawings consist of two sheets having seven figures as follows:

Fig. 6 is a schematic circuit diagram showing how the electrical connections to the four prisms may be made; and Fig. 7 is a schematic circuit diagram indicating the type of filter used between the various crystals in each prism.

Figure 1:
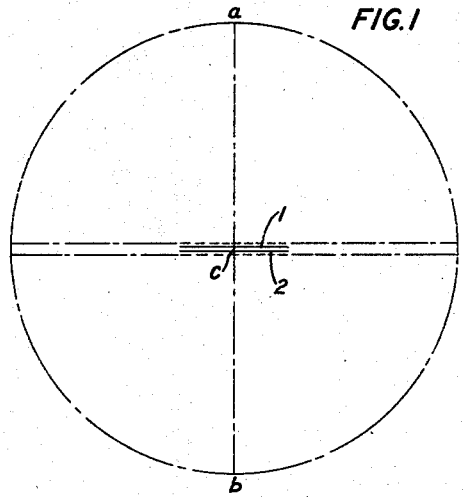
Fig. 1 is a geometrical diagram showing how two prisms placed back to back will cover a range of 360 degrees.

Fig. 1 shows two prisms 1 and 2 placed back to back. The line normal to the face of the prism 1 is the line ca and this prism is capable of working over a range plus and minus 90 degrees from such line. In the same manner the prism 2 is capable of working over a range plus and minus 90 degrees from the line cb normal to its face. In this manner two prisms may be made to cover the entire azimuthal range. The frequency ranges of the two prisms 1 and 2 will then be different but preferably substantially continuous so that a single frequency determination of an incoming signal will give a definite direction or the transmission of a single predetermined frequency will be projected in a definite direction.

Figure 2:
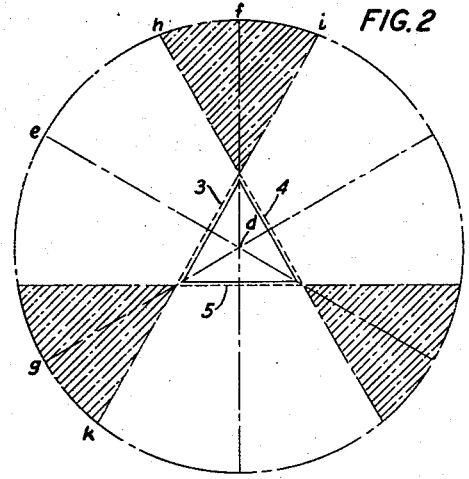
Fig. 2 is a similar geometrical diagram showing how three prisms located along the legs of an equilateral triangle will cover a range of 360 degrees.

Fig. 2 shows an arrangement of three prisms 3, 4 and 5 placed as though on the legs of an equilateral triangle. In this case the prism 3 is capable of covering a range of plus and minus 90 degrees from the line de normal to its face but will need to cover only a range of plus and minus 60 degrees or the range within the angle gdf. The overlapping portions between f and i and between g and k will be covered by the adjacent prisms 4 and 5, respectively. In this case the three prisms will have frequency ranges each different but all arranged to provide a continuous pattern. Each prism will be fed through a band-pass filter which will pass only those frequencies useful in the selected part of the total range thereof.

Figure 3:
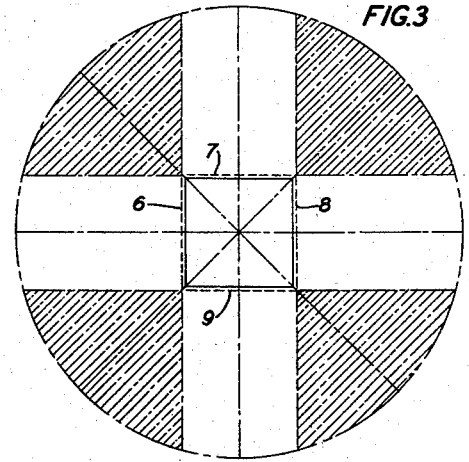
Fig. 3 is a similar geometrical diagram showing how four prisms located along the legs of a square will cover a range of 360 degrees.

Fig. 3 shows a similar arrangement wherein four prisms are employed so that only the range plus and minus 45 degrees from the line normal to the face of the prism will be used.

By way of example the four prisms will be arranged to work over the following ranges:

| Prism | Range |
|---|---|
| | Kilocycles |
| 6 | 10 to 13.3 |
| 7 | 13.3 to 17.7 |
| 8 | 17.7 to 23.6 |
| 9 | 23.6 to 31.4 | whereby any particular frequency between 10 and 31.4 kilocycles may be projected in a given direction of the entire azimuthal range or the direction of any incoming signal having a transmission including this whole range may be accurately determined.

Figure 4:
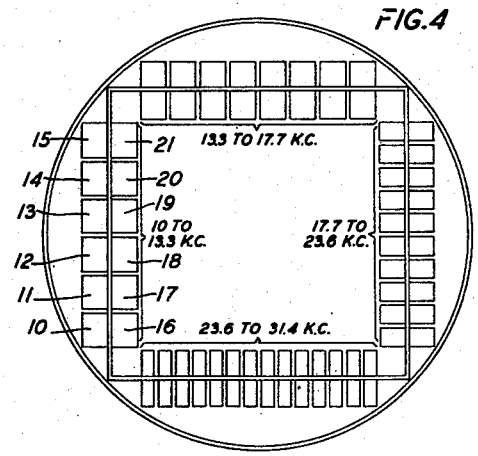
Fig. 4 is a theoretical plan view of a 360-degree prism showing the plan of four crystal arrays with frequency ranges indicated by way of example.

The general construction is shown in Fig. 4 where a square framework is provided on which the crystals and their backing resonators are mounted. The lowest frequency range has six crystal blocks 10 to 15 and their backing resonators 16 to 21, respectively. It is arranged in this way so that the separation between blocks shall be in the order of .4 of a wavelength.

The next range has eight blocks, the third has ten blocks and the highest frequency range has fourteen blocks.

Each row of crystals is placed across filter sections as shown in Fig. 6, the filter sections being of the confluent band-pass type as shown by Fig. 7. The band width of the filters is designed so that at the edge of the frequency ranges of interest, i. e., 10 to 13.3 kilocycles for example, the beam patterns of each side have been related from −45 degrees to +45 degrees. In the band-pass filter of Fig. 7 this gives a uniform frequency distribution. These values require that the band-pass filters of each section have the cut-off frequencies as follows:

| section connected to filter | cut-off frequencies |
|---|---|
| | Kilocycles |
| 22 | 9.64 and 13.6 |
| 23 | 12.85 and 18.08 |
| 24 | 17.10 and 24.10 |
| 25 | 22.80 and 32.05 |

Figure 5:
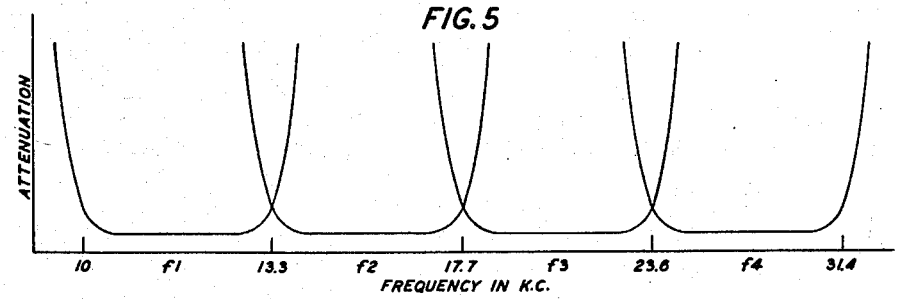
Fig. 5 is a graphical diagram showing the overlapping characteristics of the four prisms.

With such values the overlapping characteristics will be as depicted in Fig. 5 so that the effective range of each prism will be as heretofore given.

In Fig. 6 separate amplifiers 26 to 29 are connected to each line of filters and crystals. Between the main connection to this device and the said amplifiers there is a filter for each section which passes the frequency range of interest and has a 3-decibel discrimination at the band edge. These are all placed in parallel and direct the applied energy to the proper amplifier. In Fig. 6 the device is shown as controlled by a switch 30 whereby the device may be used either as a projector or a receiver. In the position shown, energy from a source of oscillations 31 is fed in parallel to each of the band-pass filters 22 to 25 and thence passed through one or the other of amplifiers 26 to 29 to one or the other of the sections. Operation of the switch 30 to its alternate position will reverse the direction of the amplifiers and direct the parallel connection from the filters to a receiver 32 instead of the oscillator 31.

In the lowest frequency range if the oscillator 31 puts out frequencies in the range 10 to 13.3 kilocycles the angular direction of the beam will be between −45 degrees and +45 degrees, with zero angle measured from normal to the low frequency surface. As the frequency approaches the dividing frequency of 13.3 kilocycles some of the energy will be impressed on the second section. This is adjusted, however, to have its angle at +45 degrees at the same frequency as the lowest frequency radiator so that the angle will vary continuously as the frequency is increased. From 13.3 kilocycles to 17.7 kilocycles the angle will vary from +45 degrees to +135 degrees, then the third surface will start radiating, and so on. In this way the angle can be varied continuously from 0 degrees to 360 degrees by varying the frequency of the oscillator 31 from 10 to 31.4 kilocycles.

The device shown in its circuit arrangement in Fig. 6, shows the first section consisting of six crystals 33 to 38 having filters 39 to 43 and a terminating network 44 in line therewith. The band-pass filter 22 feeding this section is designed to pass a band of frequencies 10 to 13.3 kilocycles before it overlaps the characteristics of the next filter as shown in Fig. 5. The other sections are shown in accordance with the previous description and in accordance with the figures and values given by way of example.

Such a device may be useful for scanning all angles at the same time. If a source of resistance noise is placed at the input, that is used as the oscillator 31, then the different frequencies will be separated out and sent over the whole 360-degree angular range. Then by operating the switch 30 to put the device in a listening position, the frequency received back will tell from which direction a reflection is coming. When a reflection is located it can be examined more accurately by limiting the frequency range projected to those frequencies which lie in the angular direction of interest. More power can be sent out in that direction since the entire power carrying capacity of one amplifier can be directed to this direction.

The resolving power of the device will be least for the lowest frequencies but the range will be the greatest. For the size now in use and for which the figures and values heretofore given apply about 1000 watts of acoustic energy can be radiated. This amounts to 56 watts for a 20-degree angular range which is equal to present standards. Hence even on a scanning system which scans the whole horizon at one pulse the distance and resolutions obtainable are as good as are obtained by present standards. When a single range is radiated considerably more power and distance can be covered than is now possible.

What is claimed is:

1. An electromechanical transducer comprising a plurality of electromechanical translating prisms of the compressional-wave, frequency-directional type each having a potential range of 180° arranged with lines normal to their longitudinal axes radiating from a common point and an electrical network associated therewith for controlling said prisms within that portion of their ranges measured by the angles formed between said radii.

2. An electromechanical transducer comprising a plurality of crystal arrays each prismatically responsive to a different band of frequencies, said bands comprising contiguous portions of a single band, each said crystal array having an angular prismatic range of 180 degrees, said crystal arrays being physically arranged with respect to each other so that lines normal to their longitudinal axes radiate from a common point and an electrical network associated therewith for controlling said crystal arrays within that portion of their ranges measured by the angles formed between said radii.

3. An electromechanical transducer comprising a plurality of electromechanical translating prisms of the compressional-wave, frequency-directional type each having a potential range of 180 degrees and responsive to different and overlapping bands of frequencies, said prisms being arranged with their longitudinal axes forming an equilateral polygon and an electrical network associated therewith for controlling said prisms each within a portion of its range measured by radii from the center of said polygon to the extremities of the chord formed by the longitudinal axis thereof.

4. An electromechanical transducer comprising four electromechanical translating prisms of the compressional-wave, frequency-directional type each having a potential range of 180 degrees and responsive to different and overlapping bands of frequencies, said prisms being arranged with their longitudinal axes forming a square and an electrical network associated therewith for controlling said prisms each within a portion of its range measured by angles of plus and minus 45 degrees from a line normal to its said longitudinal axis.

5. An electromechanical transducer comprising a plurality of crystal arrays each prismatically responsive to a different band of frequencies, said bands comprising contiguous portions of a single band, each said crystal array having a given range and the sum of said ranges of said plurality of crystal arrays comprising a complete azimuthal range of 360 degrees, said crystal arrays being physically arranged with respect to each other so that lines normal to their longitudinal axes radiate from a common point and an electrical network associated therewith for controlling said crystal arrays within that portion of said complete azimuth range measured by the angles formed between said radii.

WARREN P. MASON.

REFERENCES CITED

The following references are of record in the file of this patent:

UNITED STATES PATENTS

| Number | Name | Date |
| --- | --- | --- |
| 2,169,304 | Tournier | Aug. 15, 1939 |
| 467,102 | Huber et al. | Jan. 12, 1892 |
| 1,348,826 | Fessenden | Aug. 3, 1920 |
| 1,149,122 | Fuller | Aug. 3, 1915 |
| 1,384,014 | Fessenden | July 5, 1921 |